(12) United States Patent
Banba et al.

(10) Patent No.: US 6,410,606 B2
(45) Date of Patent: Jun. 25, 2002

(54) PROCESS FOR PRODUCING NATURAL RUBBER FOR PRESSURE-SENSITIVE ADHESIVE AND NATURAL RUBBER-BASED PRESSURE-SENSITIVE ADHESIVE COMPOSITION

(75) Inventors: Tomohide Banba; Yoshihiro Minamizaki; Isao Hirose; Toshiyuki Umehara, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/768,211

(22) Filed: Jan. 24, 2001

(30) Foreign Application Priority Data

Jan. 24, 2000 (JP) ........................................ 2000-015118

(51) Int. Cl.$^7$ ................................ C08J 3/09; C08J 3/00
(52) U.S. Cl. ........................ 521/41; 524/575.5; 528/490
(58) Field of Search ........................ 521/41; 524/575.5; 528/490

(56) References Cited

U.S. PATENT DOCUMENTS 3,925,271 A  12/1975  Balinth 5,622,998 A  *  4/1997  Tanaka et al. ........... 525/575.5

FOREIGN PATENT DOCUMENTS

EP  0 702 029 A1  3/1996

OTHER PUBLICATIONS

Gomukogyo Binran, Fourth Edition (1994), pp. 189–190), published by The Society of Rubber Industry, Japan.

Journal of the Society of Rubber Industry, Japan, vol. 71, No. 12 (1998), pp. 720–721.

* cited by examiner

Primary Examiner—James J. Seidlack
Assistant Examiner—Olga Asinovsky
(74) Attorney, Agent, or Firm—Sughrue Mion, PLLC

(57) ABSTRACT

A process for producing a natural rubber for a pressure-sensitive adhesive, which comprises decreasing a molecular weight of an unmasticated natural rubber by the action of a peptizing agent while dissolving the unmasticated natural rubber in an organic solvent, and a natural rubber-based pressure-sensitive adhesive composition comprising a natural rubber having a weigh average molecular weight Mw of 700,000 or less obtained by the process.

7 Claims, No Drawings

PROCESS FOR PRODUCING NATURAL RUBBER FOR PRESSURE-SENSITIVE ADHESIVE AND NATURAL RUBBER-BASED PRESSURE-SENSITIVE ADHESIVE COMPOSITION

FIELD OF THE INVENTION

The present invention relates to a process for producing a natural rubber for a pressure-sensitive adhesive, and a natural rubber-based pressure-sensitive adhesive composition comprising the natural rubber obtained by the process.

BACKGROUND OF THE INVENTION

Natural rubber-based pressure-sensitive adhesives are generally prepared by dissolving a natural rubber in an organic solvent such as toluene, hexane or heptane, and then dissolving therein a compounding additive such as a tackifier resin or a softening agent. However, an unmasticated natural rubber generally has very high molecular weight, and for this reason, it is difficult to directly dissolve the unmasticated natural rubber in an organic solvent. Further, if a natural rubber has too high molecular weight, the natural rubber lacks flexibility when used for a pressure-sensitive adhesive, and as a result, there is the possibility that appropriate pressure-sensitive properties may not be obtained. Therefore, in order to avoid those problems, it is necessary to appropriately decrease a molecular weight of a natural rubber and use such for blending.

A method for decreasing a molecular weight of a natural rubber is generally to previously masticate mechanically with a pressure kneader, a Banbury mixer, an open roll or the like prior to dissolving the same in an organic solvent.

However, this mechanical mastication step to adjust a molecular weight of a natural rubber consumes a huge energy. Further, because a natural rubber has a self-fusion property, the mastication step itself undergoes very large working load. In addition, load is very large particularly in handling or transportation of a rubber after mastication, other than the mastication step itself.

For example, a natural rubber just after mechanical mastication is soft, so that a self-fusion by contact tends to occur. If natural rubber is fused to form a large bulk, this results in great problem on works in the subsequent step. In order to avoid this problem, countermeasures are generally taken to form a natural rubber into predetermined shape and size and spray a powder for self-fusion prevention thereon, or to interpose a release sheet therebetween. However, there are many problems in spraying such a powder or use such a release sheet. For example, where a powder is used, working environment deteriorates by dust, and also a product is contaminated by such a powder in the form of an impurity. Further, where a release sheet is used, it is troublesome to lay many sheets, and also a sheet after use becomes an industrial waste. Furthermore, an unmasticated natural rubber adheres relatively strong to a release sheet, much labor may be required to peel the sheet in the subsequent step.

Therefore, the mastication step involves very disadvantageous elements in production cost, working standpoint and environmental standpoint, and improvement has been demenaded in the mastication step.

Further, as an environmental countermeasure, where low viscosity and high solid content concentration are intended for the purpose of decreasing the amount of an organic solvent used in blending a natural rubber with a pressure-sensitive adhesive, it needs to greatly decrease a molecular weight of a natural rubber. The conventional method involves the disadvantages that the necessity causes to conduct excess mechanical mastication, so that load in the mechanical mastication step further increases than the present.

On the other hand, a method that the degree of mastication is minimized or mastication time is shortened is considered as a method for reducing load of mechanical mastication step as possible. However, those methods have the limitation only that a molecular weight of a natural rubber is decreased to a weigh average molecular weight Mw of about 700,000 to 1,000,000, and a natural rubber having further decreased molecular weight cannot be obtained. Where a natural rubber has a molecular weight of this level, such a natural rubber satisfies properties as a pressure-sensitive adhesive tape. However, where the natural rubber is dissolved in an organic solvent, the resulting solution has considerably high viscosity, and this makes it difficult to uniformly apply a pressure-sensitive adhesive to a substrate in a small thickness in producing a pressure-sensitive adhesive tape. In producing a pressure-sensitive adhesive tape, it is preferable to decrease a molecular weight of a natural rubber to a weight average molecular weight of 700,000 or less in order to suppress a solution viscosity of a pressure-sensitive adhesive low, considering the amount of an organic solvent used.

SUMMARY OF THE INVENTION

Accordingly, one object of the present invention is to provide a process that can efficiently produce a natural rubber for a pressure-sensitive adhesive with a simple operation without passing through complicated steps.

Another object of the present invention is to provide a process that can simply and easily produce a natural rubber for a pressure-sensitive adhesive, having a desired appropriate molecular weight.

Still another object of the present invention is to provide a natural rubber-based pressure-sensitive adhesive composition that can decrease its molecular weight even though having high solid content concentration.

As a result of extensive investigations to achieve the above objects, it has been found that if a specific treatment is applied to an unmasticated natural rubber, the molecular weight of the natural rubber can easily be decreased to the desired molecular weight without passing through a mechanical mastication step, and as a result, a natural rubber solution having low viscosity even though at high solid content concentration can easily be obtained, making it possible to greatly decrease the amount of an organic solvent used. The present invention has be completed based on this finding.

The present invention provides a process for producing a natural rubber for a pressure-sensitive adhesive, which comprises decreasing a molecular weight of an unmasticated natural rubber by the action of a peptizing agent while dissolving the unmasticated natural rubber in an organic solvent.

The present invention also provides a natural rubber-based pressure-sensitive adhesive composition comprising a natural rubber having a weigh average molecular weight Mw of 700,000 or less obtained by the process.

DETAILED DESCRIPTION OF THE INVENTION

The present invention is described in detail below.

According to the present invention, the natural rubber for a pressure-sensitive adhesive is obtained by decreasing a molecular weight of an unmasticated natural rubber by the action of a peptizing agent while dissolving the unmasticated natural rubber as is in an organic solvent without controlling the molecular weight in a mechanical mastication step.

Examples of the natural rubber that can be used include standard malaysian rubber (SMR), standard vietnamese rubber (SVR), ribbed smoked sheet (RSS) Nos. 1 to 6 and pale crepe Nos. 1 to 3. However, the natural rubber that can be used is not limited to those so long as it is a general high molecular weight solid type natural rubber.

Examples of the solvent used include aromatic hydrocarbons such as toluene, and aliphatic hydrocarbons such as heptane or hexane. However, the solvent is not limited to those so long as it is an organic solvent that can dissolve a natural rubber.

The peptizing agent used herein means a reagent that can chemically cut a natural rubber molecule in an organic solvent. Preferable examples of the peptizing agent include disulfides such as o,o-dibenzamide diphenyldisulfide, and mercaptans such as 2-benzamide thiophenol zinc salt, 2-thionaphthol, thioxylenol or pentachlorothiophenol. Those compounds having a metal catalyst added thereto may also be used. Further examples of the peptizing agent that can be used include thiazoles such as 2-mercaptobenzothiazole, diacyl peroxides such as benzoyl peroxide, dialkyl peroxides such as dicumyl peroxide, and other organic peroxides.

Compounds containing reactive functional groups, such as hydroxyl group or carboxyl group, in a molecule of the above peptizing agent (hereinafter referred to as "functional group-introducing peptizing agent") may be used as a specific peptizing agent. Those compounds may be used alone or as a mixture with the above-described general peptizing agents at an optional mixing ratio. When a natural rubber is masticated using such a functional group-introducing peptizing agent, the reactive functional groups can be introduced into the natural rubber molecular chain.

Of the functional group-introducing peptizing agents, examples of compounds containing hydroxyl group include 2-hydroxydiphenyl disulfide, 2-hydroxyethyl disulfide, mercaptoethanol, and 3-mercapto-1,2-propanediol. However, the functional group-introducing peptizing agents are not limited to the above compounds, and any compounds can be used so long as it has a structure such that hydroxyl group is contained in the molecule of the above-described general peptizing agents.

Of the functional group-introducing peptizing agents, examples of compounds containing mercapto group include mercaptobenzoic acid, mercaptoacetic acid and mercaptopropionic acid. However, the functional group-introducing peptizing agents are not limited to the above compounds, and any compounds can be used so long as it has a structure such that mercapto group is contained in the molecule of the above-described general peptizing agents.

Carboxylic anhydrides such as maleic anhydride may also be used as the functional group-introducing peptizing agent. When maleic anhydride, for example, and the above-described peptizing agent are used in combination at optional mixing ratio, acid anhydride group can be introduced into a natural rubber molecular chain.

The natural rubber for a pressure-sensitive adhesive is obtained by introducing, for example, a natural rubber, an organic solvent, a peptizing agent and if necessary, appropriate additives in a dissolution tank at predetermined blending ratio, and stirring the contents at a predetermined temperature for a predetermined time. The dissolution tank used is not particularly limited so long as it is generally used in a dissolution step.

Molecular weight of the natural rubber can be controlled to the desired value by adjusting the amount of the peptizing agent introduced. The peptizing agent may be introduced together with the natural rubber at the initial charging, or may be introduced at optional timing. The peptizing agent may further be introduced such that the peptizing agent is divided into two portions, one portion is introduced at the initial stage, and another portion is introduced in the course of reaction. Molecular weight of the natural rubber can also be controlled to the aimed molecular weight by the timing for introducing the peptizing agent.

Reaction temperature can appropriately be selected depending on the kind of peptizing agent used and the aimed molecular weight of natural rubber. The reaction temperature is generally 70° C. or higher, preferably 80 to 120° C. Stirring and reaction time is a period up to that the natural rubber is completely dissolved to disappear all undissolved solid contents, and further molecular weight of the natural rubber can be decreased to the predetermined molecular weight.

According to the process of the present invention, an unmasticated natural rubber having high molecular weight, which is a solid at the initial stage, is dissolved in an organic solvent, and simultaneously the molecules thereof are chemically cut by a peptizing agent, heat energy and the like, whereby a solution of the natural rubber having the desired molecular weight (for example, weight average molecular weight Mw is 700,000 or less), which is suitable to a pressure-sensitive adhesive, can be prepared.

It is known that oxygen is generally necessary in peptizing reaction of a natural rubber. Peptizing reaction can be promoted in the present invention by blowing air in a reaction system. Where the process of the present invention is conducted at high solid content concentration, it is necessary to greatly decrease molecular weight. To this effect, it is preferable to blow air.

Viscosity of the natural rubber solution prepared in the present invention can freely be adjusted by controlling molecular weight of the natural rubber using a peptizing agent, a reaction temperature, a reaction time, an oxygen concentration or the like as parameters. For example, when the viscosity is adjusted to 80 Pa·s or less, preferably 40 Pa·s or less, in terms of Brookfield type viscometer 30° C. viscosity, such a natural rubber can directly be utilized as a pressure-sensitive adhesive composition.

The natural rubber-based pressure-sensitive adhesive composition of the present invention comprises a natural rubber having a weight average molecular weight Mw of 700,000 or less (for example, 200,000 to 700,000) obtained by the process of the present invention.

To uniformly apply the natural rubber-based pressure-sensitive adhesive composition on a substrate at a small thickness in a pressure-sensitive adhesive tape production step, it is desirable that the viscosity thereof is 80 Pa·s or less, preferably 40 Pa·s or less, in terms of Brookfield type viscometer 30° C. viscosity. If weight average molecular weight Mw of the natural rubber in the pressure-sensitive adhesive exceeds 700,000, the solid content concentration must be 20% by weight or less in order to make the solution viscosity 40 Pa·s or less. This needs a large amount of an organic solvent, which is not preferable.

The natural rubber-based pressure-sensitive adhesive composition can be produced by, if necessary, adding a tackifier resin, or conventional additives such as a crosslinking agent, softening agent, an antioxidant, a filler or the like, to the natural rubber solution obtained by the above-described process, and if necessary, adjusting a concentration of the resulting solution.

The tackifier is not particular limited, and examples thereof include rosin resins, terpene resins, petroleum resins (aliphatic, aromatic or alicyclic), coumarone-indene resins and styrenic resins. The amount of the tackifier used is generally about 5 to 180 parts by weight, preferably 70 to 130 parts by weight, per 100 parts by weight of the natural rubber.

Solid content concentration of the natural rubber-based pressure-sensitive adhesive composition is automatically determined by the aimed solution viscosity and molecular weight of a natural rubber. In view of the worldwide environmental problem, it is necessary to decrease the amount of a solvent used as less as possible, and from this point the solid content concentration is desirably 20% by weight or more (for example, about 20 to 75% by weight).

In the above-described process, decreasing molecular weight of the natural rubber after peptizing can achieve low viscosity and high solid content concentration, and as a result, can contribute to reduction in amount of an organic solvent used. Where such low viscosity and high solid content concentration are intended, it is preferable to use the above-described functional group-introducing peptizing agent. In general, if molecular weight of the natural rubber decreases, cohesive force of a pressure-sensitive adhesive tends to lower. However, if functional group is introduced into the natural rubber molecule using the functional group-introducing peptizing agent, the molecular chain can efficiently be extended by a crosslinking agent even though being considerably low molecular weight. As a result, pressure-sensitive adhesive tape properties closely near those of a high molecular weight product can be realized regard a cohesive force or the like.

The present invention is described in more detail by reference to the following Examples, but it should be understood that the invention is not construed as being limited thereto. Unless otherwise indicated, all parts, percents and the like are by weight.

EXAMPLE 1

100 Parts of a natural rubber (SMR), 0.3 part of a peptizing agent (NOCTIZER SZ, a product of Ohuchi Shinko Kagaku K.K.) and 233 parts of toluene were introduced into a flask, and stirred at 80° C. for 10 hours to obtain a peptized natural rubber solution. 100 Parts of a tackifier (YS RESIN PX1000, a product of Yasuhara Chemical Co.) were added to the solution obtained above, thereby obtaining a natural rubber-based pressure-sensitive adhesive solution.

The natural rubber-based pressure-sensitive adhesive solution thus obtained was measured for a 30° C. viscosity using a Brookfield type viscometer and a solid content base by a method of weight loss on heating. Further, molecular weight of the natural rubber used was measured using a Gel Permeation Chromatography (GPC).

The results obtained are shown in Table 1 below.

4 Parts of an isocyanate crosslinking agent (MILLIONATE MTL, a product of Nippon Polyurethane Industry Co.) were added to the natural rubber-based pressure-sensitive adhesive solution obtained above. The resulting solution was applied on a biaxially stretched polypropylene film having a thickness of 40 μm, and an organic solvent was volatilized with hot air, thereby obtaining a natural rubber-based pressure-sensitive tape having a 25 μm thick pressure-sensitive adhesive layer.

The pressure-sensitive tape thus obtained was cut in 25 mm width, and the cut tape was adhered on a stainless steel plate, and then press adhered by reciprocating a rubber roll having a weight of 2 kg thereon. The cut tape was allowed to stand at room temperature for 30 minutes, and then subjected to a 180° peel test to a stainless steel plate. Thus, adhesive force of the pressure-sensitive tape to a stainless steel plate was measured.

The results obtained are shown in Table 2 below.

The pressure-sensitive tape was adhered on a stainless steel plate with an adhered area of 25 mm×25 mm, and then press adhered by reciprocating a rubber roll having a weight of 2 kg thereon. The cut tape was allowed to stand at 40° C. for 30 minutes, and a load of 2 kg was then applied thereto at 40° C. to a creep test to a stainless steel plate at 40° C. Holding time until drop of the pressure-sensitive tape was measured. The results obtained are shown in Table 2 below.

Further, the pressure-sensitive tape was adhered on a stainless steel plate with an adhered area of 25 mm×25 mm, and then press adhered by reciprocating a rubber roll having a weight of 2 kg thereon. The cut tape was allowed to stand at 23° C. for 30 minutes, and a load of 2 kg was then applied thereto at 23° C. to conduct a creep test to a stainless steel plate at 23° C. Deviation distance of the pressure-sensitive tape after 30 minutes from initiation of the test was measured. The results obtained are shown in Table 2 below.

EXAMPLE 2

100 Parts of a natural rubber (SMR), 1.0 part of a peptizing agent (NOCCELER M, a product of Ohuchi Shinko Kagaku K.K.) and 163 parts of toluene were introduced into a flask, and stirred at 90° C. for 10 hours while blowing a slight amount of air to obtain a peptized natural rubber solution. 100 Parts of a tackifier (YS RESIN PX1000, a product of Yasuhara Chemical Co.) were added to the solution obtained above, thereby obtaining a natural rubber-based pressure-sensitive adhesive solution.

Viscosity and solid content base of the natural rubber-based pressure-sensitive adhesive solution thus obtained were measured in the same manner as in Example 1. In addition, molecular weight of the natural rubber used was measured in the same manner as in Example 1. The results obtained are shown in Table 1 below.

Further, a pressure-sensitive adhesive tape was prepared using the natural rubber-based pressure-sensitive adhesive solution obtained above in the same manner as in Example 1, and the pressure-sensitive tape was subjected to a 180° peel test to a stainless steel plate and a creep test to a stainless steel plate in the same manner as in Example 1. The results obtained are shown in Table 2 below.

EXAMPLE 3

100 Parts of a natural rubber (SMR), 0.1 part of a peptizing agent (NOCTIZER SZ, a product of Ohuchi Shinko Kagaku K.K.) and 400 parts of toluene were introduced into a flask, and stirred at 90° C. for 8 hours to obtain a peptized natural rubber solution. 100 Parts of a tackifier (YS RESIN PX 1000, a product of Yasuhara Chemical Co.)

were added to the solution obtained above, thereby obtaining a natural rubber-based pressure-sensitive adhesive solution.

Viscosity and solid content base of the natural rubber-based pressure-sensitive adhesive solution thus obtained were measured in the same manner as in Example 1. In addition, molecular weight of the natural rubber used was measured in the same manner as in Example 1. The results obtained are shown in Table 1 below.

6 Parts of an isocyanate crosslinking agent (CORONATE L, a product of Nippon Polyurethane Industry Co.) were added to the natural rubber-based pressure-sensitive adhesive solution obtained above. The resulting solution was applied on a biaxially stretched polypropylene film having a thickness of 40 μm, and an organic solvent was volatilized with hot air, thereby obtaining a natural rubber-based pressure-sensitive tape having a 25 μm thick pressure-sensitive adhesive layer.

The pressure-sensitive tape was subjected to a 180° peel test to a stainless steel plate and a creep test to a stainless steel plate in the same manner as in Example 1. The results obtained are shown in Table 2 below.

Comparative Example

A natural rubber (RSS grade 1) was passed through open rolls several times to conduct a light mechanical mastication, thereby reducing molecular weight of the natural rubber.

100 Parts of the masticated natural rubber, and 100 parts of toluene were introduced into a flask, and were stirred to dissolve the rubber in toluene (without addition of a peptizing agent), thereby obtaining a natural rubber solution. 100 Parts of a tackifier (YS RESIN Px1000, a product of Yasuhara Chemical Co.) were added to the natural rubber solution obtained above, thereby obtaining a natural rubber-based pressure-sensitive adhesive solution.

Viscosity and solid content base of the natural rubber-based pressure-sensitive adhesive solution thus obtained were measured in the same manner as in Example 1. In addition, molecular weight of the natural rubber used was measured in the same manner as in Example 1. The results obtained are shown in Table 1 below.

4 Parts of an isocyanate crosslinking agent (CORONATE L, a product of Nippon Polyurethane Industry Co.) were added to the natural rubber-based pressure-sensitive adhesive solution obtained above. The resulting solution was applied on a biaxially stretched polypropylene film having a thickness of 40 μm, and an organic solvent was volatilized with hot air, thereby obtaining a natural rubber-based pressure-sensitive tape having a 25 μm thick pressure-sensitive adhesive layer.

The pressure-sensitive tape was subjected to a 180° peel test to a stainless steel plate and a creep test to a stainless steel plate in the same manner as in Example 1. The results obtained are shown in Table 2 below.

TABLE 1

|  | Example 1 | Example 2 | Example 3 | Comparative Example |
|---|---|---|---|---|
| Solution viscosity at 30° C. (Pa.s) | 20 | 20 | 20 | 20 |
| Weight average molecular weight, Mw | 340,000 | 230,000 | 500,000 | 860,000 |

TABLE 1-continued

|  | Example 1 | Example 2 | Example 3 | Comparative Example |
|---|---|---|---|---|
| Solid content base (wt %) | 46 | 55 | 33 | 17 |

TABLE 2

|  | Example 1 | Example 2 | Example 3 | Comparative Example |
|---|---|---|---|---|
| 80° Peel adhesive force to SUS (N/25 mm) | 7.75 | 8.85 | 8.83 | 7.75 |
| Creep test to SUS | 28 | 22 | 177 | 27 |
| Creep test to SUS 23° C. × 2 kg × 30 min Deviation (mm) | 0.30 | 0.40 | 0.05 | 0.50 |

Amount of toluene used necessary in producing pressure-sensitive tapes of the same amount was calculated from the measured solid content base with respect to the natural rubber-based pressure-sensitive adhesive solutions obtained in Examples 1 to 3 and Comparative Example. The amounts of toluene used in Examples 1, 2 and 3 on the basis that the amount of toluene used in the Comparative Example was 100 are shown in Table 3 below.

TABLE 3

|  | Example 1 | Example 2 | Example 3 | Comparative Example |
|---|---|---|---|---|
| Amount of toluene used in production of pressure-sensitive adhesive tape | 24 | 16 | 42 | 100 |

Light mechanical mastication step by open rolls was conducted in the production process of the Comparative Example. However, although the degree of mastication was small, the work to pass a block of a natural rubber which is a heavy weight material consumes energy, and also imposes a great burden to a worker. Further, thin sheets of natural rubber just after mastication with open rolls weld together when those are piled. Therefore, it is necessary to interpose a release sheet between the adjacent two thin sheets to prevent mutual contact of the natural rubber thin sheets. Further, the release sheets must be peeled and disposed in the subsequent step for dissolving the rubber. Use of the release sheet is not desirable in the point of increase of working steps or discharge of industrial wastes.

On the other hand, Examples 1, 2 and 3 according to the process of the present invention do not undergo a mechanical mastication step, and therefore do not involve the above-described problems.

As shown in Table 1, the values of solution viscosity of the natural rubber-based pressure-sensitive adhesives in Examples 1, 2 and 3 and the Comparative Example are all the same of 20 Pa·s, but the molecular weight greatly differs between the Examples and the Comparative Example such that the weight average molecular weight Mw of the natural rubber in the Comparative Example exceeds 700,000.

The properties of a pressure-sensitive adhesive are substantially the same between Examples 1 and 2 and the Comparative Example as shown in Table 2. It is understood from this that the pressure-sensitive tapes obtained by the process according to the present invention can obtain the properties equivalent to those of the pressure-sensitive tapes prepared by the conventional process. In the Examples, although molecular weight of the natural rubber is low, properties required as a pressure-sensitive tape were not impaired by selecting the kind of a crosslinking agent used.

Further, as shown in Table 2, the pressure-sensitive tape obtained in Example 3 has well-balanced flexibility and cohesiveness, and can obtain better pressure-sensitive properties as compared with the Comparative Example.

Regarding the amount of an organic solvent used, there is great difference between Examples 1 to 3 and the Comparative Example. Specifically, the solid content base in the Comparative Example is 17 wt % which is far smaller than that in Examples 1 to 3, and the amount of toluene used in producing a pressure-sensitive tape of the same amount is very large as shown in Table 3. Where molecular weight of the natural rubber cannot be decreased to a weight average molecular weight Mw of 700,000 or less by a light mechanical mastication as in the Comparative Example, the solid content base of a pressure-sensitive adhesive becomes 20% by weight or less in order to make the viscosity a level of 20 Pa·s. This clearly shows that a large amount of an organic solvent is needed. On the other hand, in Examples 1, 2 and 3, the amount of toluene used is very small as compared with that of the Comparative Example as shown in Table 3. It is understood that low viscosity and high solid content base pressure-sensitive adhesive solution can smoothly be prepared if molecular weight of a natural rubber is decreased by the production process of the present invention, and this enable amount of an organic solvent to greatly decrease.

The process according to the present invention can produce a natural rubber-based pressure-sensitive adhesive solution comprising a natural rubber having an optional weight average molecular weight Mw of 700,000 or less suitable to a pressure-sensitive adhesive, without passing through a mechanical mastication step of a natural rubber. The production process of the present invention that can omit a mechanical mastication step is very advantageous in all of production cost, working aspect and environmental aspect.

Further, further decreasing molecular weight of a natural rubber can produce a natural rubber-based pressure-sensitive adhesive having low viscosity and high solid content concentration, and great decrease in amount of an organic solvent used can be realized by appropriately selecting the kind of a crosslinking agent without deterioration of properties required as a pressure-sensitive tape.

Further, molecular weight of a natural rubber can optionally be controlled, so that it is easy to design a pressure-sensitive adhesive having a molecular weight as a parameter in conformity with tape characteristics.

What is claimed is:

1. A process for producing a natural rubber for a pressure-sensitive adhesive, which comprises decreasing a molecular weight of an unmasticated natural rubber by the action of a peptizing agent while dissolving the unmasticated natural rubber in an organic solvent.

2. The process as claimed in claim 1, wherein said organic solvent is an aromatic hydrocarbon solvent or an aliphatic hydrocarbon solvent.

3. The process as claimed in claim 1, wherein said peptizing agent is selected from disulfides, mercaptans, thiazoles, diacyl peroxides, dialkyl peroxides, or organic peroxides.

4. The process as claimed in claim 1, wherein said peptizing agent is a compound having reactive functional group contained therein.

5. The process as claimed in claim 4, wherein said functional group is hydroxyl group or carboxyl group.

6. A natural rubber-based pressure-sensitive adhesive composition comprising a natural rubber having a weight average molecular weight Mw of 700,000 or less obtained by the process as claimed in claim 1.

7. A natural rubber-based pressure-sensitive adhesive composition comprising a natural rubber obtained by the process as claimed in claim 1, wherein said composition has a solid content concentration of from 33 to 75 percent by weight.

* * * * *